United States Patent [19]

Valls

[11] Patent Number: 4,693,483

[45] Date of Patent: * Sep. 15, 1987

[54] COMPOSITE GASKET AND FITTING INCLUDING SAME

[75] Inventor: Jose E. Valls, Ponce, P.R.

[73] Assignee: Vassallo Research & Development Corporation, Ponce, P.R.

[ * ] Notice: The portion of the term of this patent subsequent to Jan. 20, 2004 has been disclaimed.

[21] Appl. No.: 692,700

[22] Filed: Jan. 18, 1985

Related U.S. Application Data

[63] Continuation-in-part of Ser. No. 630,527, Jul. 13, 1984, Pat. No. 4,637,618.

[51] Int. Cl.⁴ .............................................. F16J 15/32
[52] U.S. Cl. ................................ 277/207 A; 277/152; 285/110; 285/231; 285/379
[58] Field of Search ............. 277/152, 207 A, DIG. 2; 285/110, 113, 231, 345, 379

[56] References Cited

U.S. PATENT DOCUMENTS

| | | | |
|---|---|---|---|
| Re. 27,736 | 8/1973 | Muhlner et al. | 264/571 |
| 1,826,321 | 10/1931 | Mitchell . | |
| 1,856,580 | 5/1932 | Mitchell . | |
| 2,205,910 | 6/1940 | Raybould | 288/19 |
| 2,883,224 | 4/1959 | Riesing et al. | 288/2 |
| 2,935,349 | 5/1960 | Burch | 288/7 |
| 2,953,398 | 9/1960 | Haugen et al. | 285/110 |
| 3,058,752 | 10/1962 | Miller | 277/171 |
| 3,124,366 | 3/1964 | Hillman | 277/180 |
| 3,171,662 | 3/1965 | Warn et al. | 277/211 |
| 3,265,410 | 8/1966 | Lorang | 285/231 X |
| 3,377,659 | 4/1968 | Hucks, Jr. | 425/392 |
| 3,493,236 | 2/1970 | Kleindienst | 277/207 X |
| 3,520,047 | 7/1970 | Muhlner et al. | 264/249 |
| 3,588,132 | 6/1971 | Edmonson | 277/207 |
| 3,680,874 | 8/1972 | Schwarz | 277/153 |
| 3,793,427 | 2/1974 | Heisler | 264/249 |
| 3,807,027 | 4/1974 | Heisler | 425/392 |
| 3,823,216 | 7/1974 | Petzetakis | 264/571 |
| 3,857,589 | 12/1974 | Oostenbrink | 285/118 |
| 3,924,881 | 12/1975 | O'Connor | 285/156 |
| 4,032,159 | 8/1977 | Zitting | 277/145 |
| 4,040,636 | 8/1977 | Albertson et al. | 277/188 A |
| 4,053,166 | 10/1977 | Domkowski | 277/152 |
| 4,066,269 | 1/1978 | Linne | 277/228 |
| 4,097,076 | 6/1978 | Wackenreuther et al. | 285/340 |
| 4,120,521 | 10/1978 | Parmann | 285/113 |
| 4,181,698 | 1/1980 | Hayes et al. | 264/249 |
| 4,223,896 | 9/1980 | Strom | 277/207 A |
| 4,229,026 | 10/1980 | Seiler | 285/105 |
| 4,230,157 | 10/1980 | Larsen et al. | 138/155 |
| 4,268,045 | 5/1981 | Traub | 277/121 |
| 4,269,437 | 5/1981 | Shaw et al. | 285/109 |
| 4,336,014 | 6/1982 | Parmann | 425/393 |
| 4,343,480 | 8/1982 | Vassallo | 277/207 A |
| 4,353,860 | 10/1982 | Gordon | 264/296 |
| 4,362,323 | 12/1982 | Lodder et al. | 285/4 |
| 4,368,894 | 1/1983 | Parmann | 277/166 |
| 4,379,559 | 4/1983 | Bohman | 277/207 A |
| 4,386,045 | 5/1983 | Vaisanen | 425/393 |
| 4,387,900 | 6/1983 | Ditcher et al. | 277/101 |
| 4,428,900 | 1/1984 | Riley et al. | 264/526 |

FOREIGN PATENT DOCUMENTS

| | | | |
|---|---|---|---|
| 3232075 | 3/1984 | Fed. Rep. of Germany | 277/207 A |
| 53-127578 | 11/1978 | Japan | 264/322 |
| 1133412 | 11/1968 | United Kingdom | 285/110 |
| 1158358 | 7/1969 | United Kingdom | 285/379 |

*Primary Examiner*—Robert S. Ward
*Attorney, Agent, or Firm*—Roylance, Abrams, Berdo & Goodman

[57] ABSTRACT

A composite gasket for forming a seal between a pipe bell 52 and a spigot 58 comprises a major portion 12 of non-elastomeric plastic material and a minor portion 14 of elastomeric material. The minor portion is axially encased by the major portion. The minor portion includes a sealing lip 16 extending radially inwardly from the major portion. The composite gasket can be manually inserted within a preformed grooved bell or the grooved bell can be formed over the gasket while the gasket is mounted on a mandrel. The composite gasket is particularly useful with relatively large diameter pipe systems.

16 Claims, 9 Drawing Figures

4,693,483

COMPOSITE GASKET AND FITTING INCLUDING SAME

CROSS-REFERENCE TO RELATED APPLICATION

This application is a continuation-in-part of U.S. patent application Ser. No. 630,527, filed July 13, 1984, now U.S. Pat. No. 4,637,618, in the name of Jose E. Valls and entitled "PlasticEncased Gasket".

FIELD OF THE INVENTION

The present invention relates to a composite gasket comprising a major portion of non-elastomeric material and a relatively minor elastomeric portion forming a sealing lip. Additionally, the present invention relates to an improved pipe fitting including the composite gasket, particularly for large diameter pipe, and a method of forming a pipe bell with the composite gasket.

BACKGROUND OF THE INVENTION

In plastic pipe systems, connections between the various components must be sealed to prevent escape of fluids from the connections. The connections typically comprise an enlarged bell which receives a spigot. The spigot and bell can be formed as segments of pipe lengths or connecting members, such as elbows, T's, etc. In this application, the terms "fitting" and "pipe" are intended to include both pipe lengths and connecting members.

The seal between the bell and spigot is conventionally provided by a gasket mounted in one of the components of a connection and sealingly and resiliently engaging the other component. Most often, the seal is mounted in the bell and has at least one radially inwardly projecting sealing lip which is engaged and deformed by the spigot such that a tight interference fit is formed between the spigot and sealing lip to prevent the escape of fluid.

Gaskets formed exclusively of elastomeric material, such as natural rubber, are disadvantageous since they can be displaced from their intended position so as not to provide an adequate seal. For example, such gaskets may blow out of their mounting when pressurized or may be pushed from their intended position during insertion of the spigot within the bell.

Gaskets reinforced with metal bands can be deformed and the metal can corrode rendering the gaskets useless. Moreover, when such gaskets are made an integral segment of the pipe spigot, deformation or corrosion of the metal band renders the entire pipe section useless.

More recently, gaskets reinforced with plastic locking rings have been increasingly used. Such gaskets are described in U.S. Pat. No. 4,343,480 to E. D. Vassallo. However, the cost of elastomeric materials, such as rubber, has significantly increased in recent years, thus forming a significant factor in the cost of fittings. Although the gaskets utilizing plastic locking rings contain less rubber than those made entirely or rubber, the rubber still forms a major portion of the gasket and thus greatly affects its cost.

SUMMARY OF THE INVENTION

It has now been discovered that the disadvantages associated with the use of conventional seals for plastic pipe systems are eliminated by employing a composite gasket comprising a major portion of non-elastomeric plastic material and a minor portion of elastomeric material encased within the major portion and provided with an elastomeric sealing lip extending radially from the major portion. The major portion axially encases the minor portion and a sealing lip extends from the major portion in a radial direction.

By forming the gasket in this manner, material costs for forming the gasket can be significantly reduced since the amount of the relatively expensive, elastomeric material is reduced substantially. The material forming the major portion is significantly less expensive, thus reducing the cost of the entire gasket. The more rigid, nonelastomeric material reinforces the gasket and retains it in its proper position such that it is not blown out when subjected to pressure or pushed from its desired mounting upo joining of the bell and spigot. The plastic reinforcement will not corrode and its inherent resiliency will prevent permanent damage by deformation. Additionally, if the present gasket becomes defective, it can readily be removed from the fitting and replaced without the need to replace the entire fitting. These advantages are particularly significant with large diameter pipe, i.e., pipe having a nominal diameter of greater than about 8 inches, and preferably between about 10 inches and about 36 inches.

Manufacture of the composite gasket can be facilitated by forming the major portion in first and second segments which entrap the minor, elastomeric portion between them. The connection between these segments is preferably provided by a latch member on one segment and a recess in the other member which mate to positively interlock the two segments. The segments can also be bonded by welding or by an adhesive. The non-elastomeric material for forming the major portion can be a polyolefin, such as polyethylene or polypropylene; poly(vinylchloride), and the like materials which are usually synthetic, thermoplastic polymers and capable of being processed by extrusion, moulding, etc., but which are not capable of rapidly returning to their original length after being significantly stretched.

The elastomeric portion is formed from those materials commonly termed "elastomeric", such as the various rubbers, for example, styrene-butadiene copolymer, neoprene, butyl rubber, nitrile rubber, silicone rubber and the like. Since the minor portion forms a sealing lip, it must be more resilient than the major portion. However, both the major and minor portions of the gasket can be resilient for insertion of the gasket into a preformed bell groove. When the bell groove is formed about the gasket, the major portion should be relatively rigid.

A second sealing lip can be mounted in and can extend from the major portion in a radial direction, opposite to the first sealing lip.

The minor portion of the composite gasket can have a generally T-shaped transverse cross-sectional configuration. The sealing lip is formed by the vertical leg of the T-shape and may have a generally triangular configuration, while the cross member of the T-shape forms an enlarged head facilitating retention of the minor portion within the major portion.

The connection between the pipe bell and the gasket can be enhanced by bonding the gasket directly to the bell by adhesive or welding. This connection can be enhanced by forming the bell and the composite gasket major portion of the same material.

The composite gasket can be mounted within a pipe bell formed with a radially inwardly opening circumferential groove by deforming the gasket into a "heart" shape, and then releasing the gasket to fit within the preformed groove. Alternatively, the composite gasket can be mounted on a mandrel, and then a portion of the fitting is softened by heating and passed over the mandrel and gasket. In this alternative method, the gasket serves to form the groove and is firmly retained within the formed groove after cooling of the bell around the gasket.

Other advantages and salient features of the present invention will become apparent from the following detailed description, which, taken in conjunction with the annexed drawings, discloses preferred embodiments of the present invention.

DETAILED DESCRIPTION OF PREFERRED EMBODIMENTS

Figure 1:
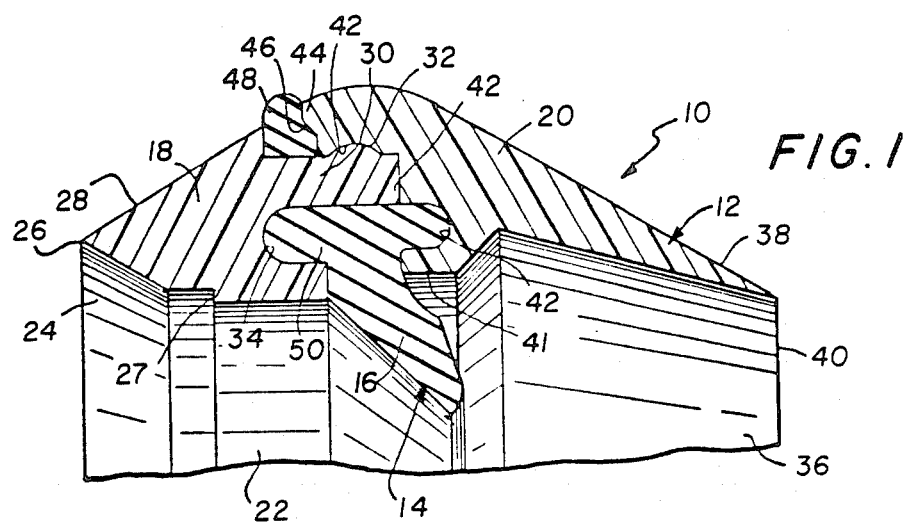
FIG. 1 is a partial, side elevational view, in section, of a composite gasket according to a first embodiment of the present invention.

Referring initially to FIG. 1, the composite gasket of the present invention comprises a major portion 12 of non-elastomeric, plastic material and a minor portion 14 of elastomeric material. The major portion encases the minor portion in both axial directions and in a radially outward direction. The minor portion has a non-encased radially inwardly extending sealing lip 16 in which the non-encased portion has a greater radial length than the encased portion of said minor portion.

Major portion 12 includes a front axial segment 18 and a rear axial segment 20. The segments are generally annular in shape and are coupled or interlocked to each other. In transverse cross section, each segment has a generally triangular peripheral configuration. Segments 18 and 20 are preferably formed of a polyolefin, such as polyethylene or polypropylene, with polyethylene being especially preferred.

Front axial segment 18 has a generally cylindrical inner surface 22, with a tapered portion 24 adjacent its free, front end 26 and with a radially extending shoulder 27 spaced axially from tapered portion 24. Its outer surface 28 extends upwardly and radially outwardly. The radially extending, rear axial face of front segment 18 has an axially and rearwardly extending latch member 30 with an enlarged free end 32. Radially inwardly of latch member 30, a circumferential recess 34 is formed within the rear face of front segment 18 for receiving a section of minor portion 14.

Rear axial segment 20 has an inner surface 36 and an outer surface 38 terminating at a rear edge 40. The cylindrical surface 41, forming the portion of inner surface 36 adjacent minor portion 14, has a greater diameter than cylindrical inner surface 22 to provide an annular space in the major portion for sealing lip 16 upon insertion of a spigot. The front face of rear segment 20 has an axially extending circumferential recess 42. Recess 42 has an enlarged inner or rear end for receiving enlarged end 32 of latch member 30. The radially inward portion of recess 42 is configured similarly and somewhat smaller than recess 34 in front segment 18. The upper front end 44 has an undercut 46 and is spaced in an axial direction from the adjacent portion of front axial segment 18. This space and undercut 46 house a second seal lip 48 which is circumferential and which is generally L-shape in transverse cross section. Alternatively, second seal lip 48 can be an O-ring. The second seal extends in a radial direction from major portion 12 opposite to that of first sealing lip 16.

Minor portion 14 is circumferential and has a substantially T-shaped transverse, cross-sectional configuration. The vertical leg of the T forms first sealing lip 16 which is generally triangular in transverse cross section and tapers in a radially inward direction. Cross member 50 extends in an axial direction, and forms an enlarged head for the minor portion with its axial ends received and retained in recesses 34 and 42. The radially outwardly directed cylindrical surface of cross member 50 underlies latch member 30. In this manner, the minor portion is encased in both axial directions and in a radially outward direction by the major portion.

Segments 18 and 20 are separately formed and are then joined, trapping minor portion 14 and second seal lip 48 therebetween. The segments can be held together solely by the positive interlocking engagement of latch member 30 and recess 42. The resilient and flexible nature of elastomeric cross member 50 provides a biasing force against latch member 30 to retain it in a locking position with recess 42 by pushing it radially outwardly, while permitting it to move radially inwardly for connecting the two segments. After attachment of the two segments with the minor portion and second seal lip entrapped therebetween, segments 18 and 20 can be bonded by an adhesive or by welding, e.g., ultrasonic or spin welding to prevent disengagement.

Figure 2:
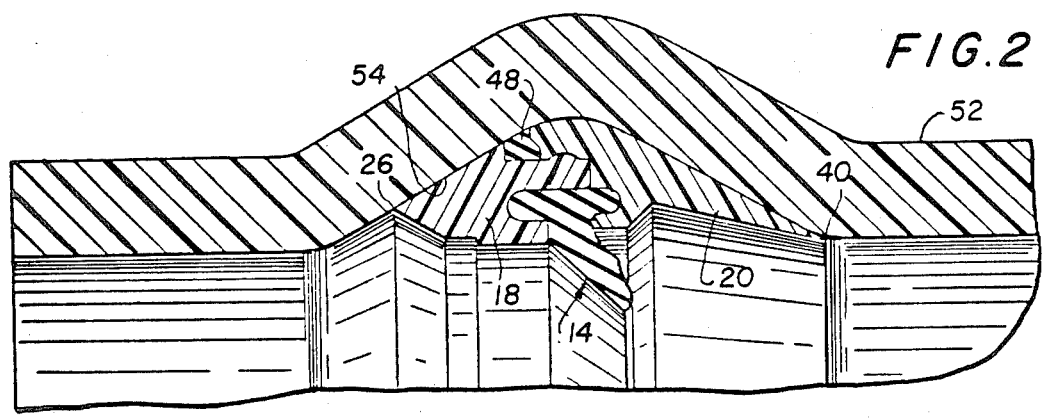
FIG. 2 is a partial, side elevational view, in section, of the composite gasket of FIG. 1 mounted within a pipe bell.
Figure 3:
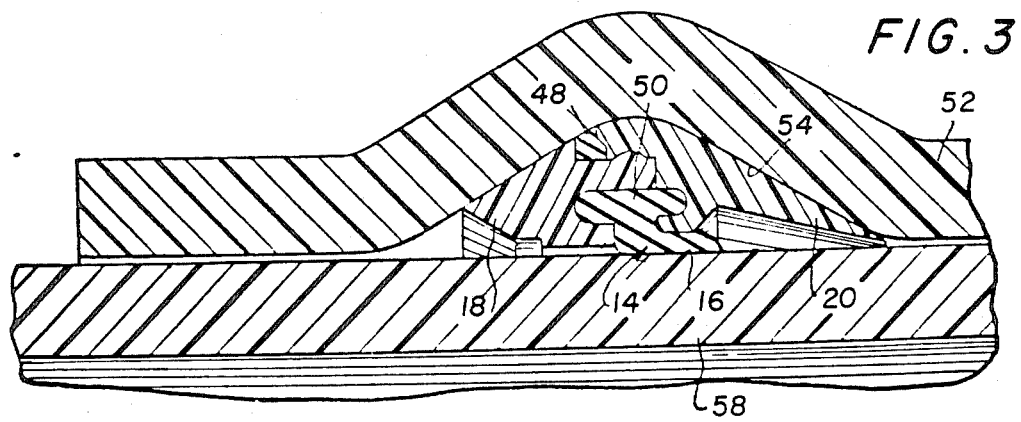
FIG. 3 is a side elevational view of the composite gasket and bell of FIG. 2, after insertion of a spigot.

Composite gasket 10, as illustrated in FIG. 2 is located within a cylindrical fitting 52. The fitting has a radially extending, inwardly opening circumferential groove 54 which receives composite gasket 10. the composite gasket is particularly effective with fittings, having an internal diameter greater than about 8 inches, and preferably between about 10 inches and about 36 inches.

When a spigot 58 is inserted within fitting 52, first sealing lip 16 is deformed to provide a fluid tight seal between fitting 52 and spigot 58. Second sealing lip 48 is pressed against the fitting surface defining groove 54 and enhances the fluid tight seal by preventing fluid from travelling between major portion 12 and fitting 52, along groove 54.

The relative rigid nature of non-elastomeric major portion 12 positively retains the composite gasket properly within groove 54. Thus, blowout during pressurization of the conduits, and fishmouthing during insertion of the spigot is prevented. The connection between the composite gasket and the fitting can be enhanced by bonding axial segments 18 and 20 to body 52. This bonding can be accomplished by an adhesive or by welding, such as ultrasonics or spin welding. The welding can be enhanced by forming major portion 12 and fitting 52 of substantially identical materials.

Figure 4:
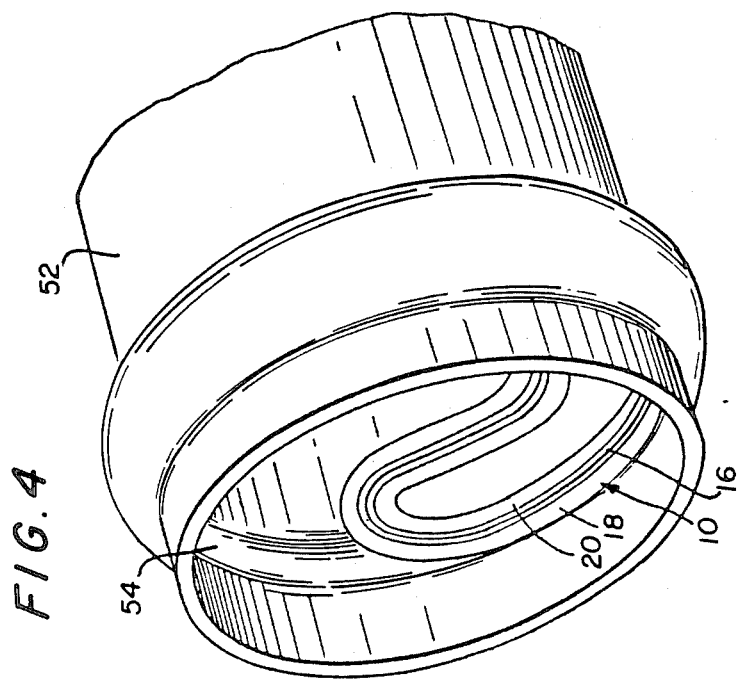
FIG. 4 is a partial, perspective view of one method of mounting the composite gasket of FIG. 1 within a preformed pipe bell.

FIG. 4 illustrates one method of installing composite gasket 10 within a fitting bell having a preformed groove 54. The gasket is manually bent in the form of a "heart", and is then introduced by hand within the bell. The gasket is slowly released inside groove 54 to properly seat the gasket within the groove. If desired, major portion 12 of gasket 10 can be bonded to fitting 52 by adhesive or welding. For this installation method, major portion 12 should be relatively flexible and resilient.

Figure 5:
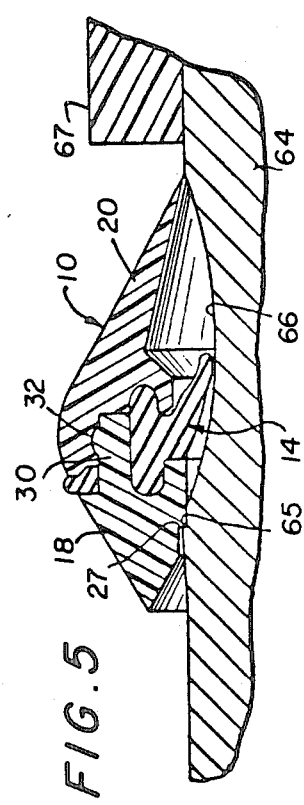
FIGS. 5-7 are partial, side elevational views, in section, of various steps of forming the bell over the gasket of FIG. 1 according to an alternative method.
Figure 6:
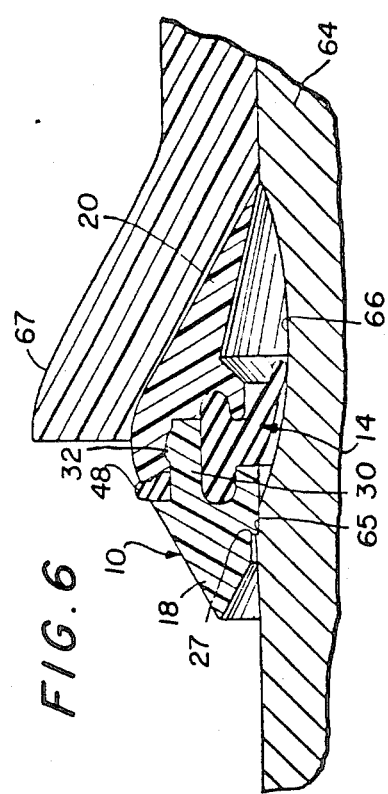
Figure 7:
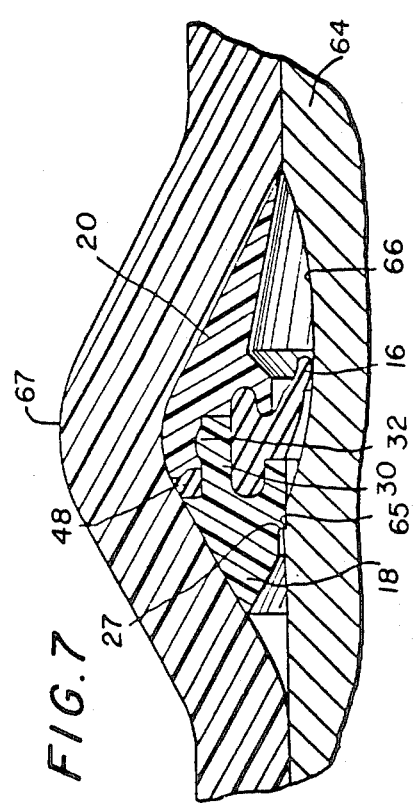

FIGS. 5-7 illustrate a method of assembling the fitting bell and the composite gasket in which groove 54 is formed by the composite gasket during the belling operation. In this method, the gasket is suitably retained on a belling mandrel 64.

Shoulder 27 of gasket 10 cooperates with annular projection 65 on mandrel 64 to aid in preventing movement of gasket 10 during formation of the fitting. However, shoulder 27 is optional since adequate frictional engagement is normally provided by deformation of sealing lip 16 against mandrel 64. In such event, tapered portion 24 extends to cylindrical surface 22 and projection 65 on the mandrel is eliminated.

Mandrel 64 can be provided with a recess 66 for receiving sealing lip 16 to prevent possible excessive pressure upon sealing lip 16 and, thus, gasket 10. Alternatively, recess 66 can be eliminated resulting in a cylindrical mandrel.

One end of a fitting 67 is heated and passed over mandrel 64, as illustrated in FIGS. 5 and 6, to form the bell. The fitting is pushed along the mandrel and over the gasket, as illustrated in FIGS. 6 and 7, to form the groove. According to this embodiment of the invention, major portion 12 may be formed of a non-resilient rigid polymer to provide a good molding surface for forming the groove. Upon subsequent cooling, the fitting with the gasket retained therein can be removed from the mandrel.

In FIGS. 5-7, the gasket is depicted having enlarged end 32 on latch member 30 for locking parts 18 and 20. However, the provision of enlarged end 32 is optional amd may be eliminated when adequate frictional engagement between parts 18 and 20 is present without enlarged end 32.

Figure 8:
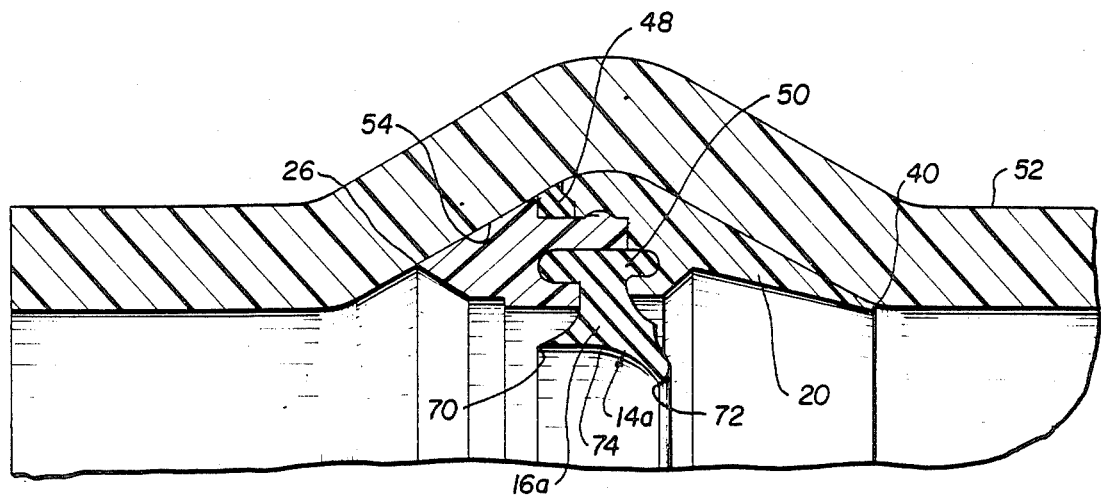
FIG. 8 is a partial, side elevational view, in section, of a composite gasket according to a second embodiment of the present invention within a pipe bell.
Figure 9:
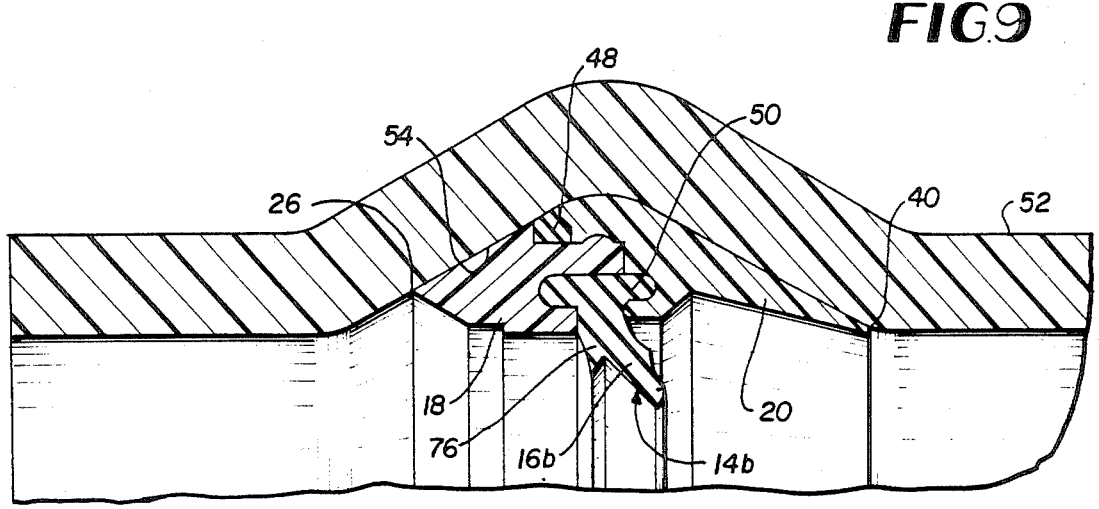
FIG. 9 is a partial, side elevational view, in section, of a composite gasket according to a third embodiment of the present invention within a pipe bell.

FIGS. 8 and 9 illustrate modified forms of the composite gasket wherein the shape of the sealing lip of the minor portion extending radially inwardly from the major portion is different from that shown in FIGS. 1-7. The remaining portions of the composite gasket, including cross member 50, segments 18 and 20 and second seal lip 48 are identical to the embodiment of FIG. 1.

In FIG. 8, minor portion 14a has a first sealing lip 16a which is generally triangular in transverse section. The apex of the triangle is attached to cross member 50, while the sides of the triangle are somewhat arcuate. The leading edge 70 is spaced radially outwardly of the trailing edge 72, the edges being connected by an arcuate surface 74.

In FIG. 9, minor portion 14b has a sealing lip 16b, similar to lip 16 of the first embodiment, but with an additional, radially inwardly extending lip 76. Lip 76 is triangular and tapers in a radially inward direction. Such lip 76 is located upstream of lip 16b and extends inwardly from the major portion segments for a distance significantly less that lip 16b.

The composite gasket of the present invention can be reversed such that the gasket is mounted within the spigot and forms a seal with the bell. In such arrangement, the sealing lip on the minor portion would extend in a radially outward direction and the minor portion would be encased axially and in a radially inward direction.

Although the invention has been described in considerable detail with particular reference to certain preferred embodiments thereof, variations and modifications can be effected within the spirit and scope of the invention as defined in the appended claims.

What is claimed is:

1. A composite gasket for forming a seal between a pipe bell and a spigot, comprising:
    a major portion of non-elastomeric plastic material; and
    a minor portion of elastomeric material, said minor portion being axially encased by said major portion and having a first sealing lip extending from said major portion in a radial direction, said major portion including first and second segments entrapping said minor portion therebetween, said segments having interlocking sections, said sealing lip being triangular in transverse cross section and tapering in a radial direction toward said major portion.

2. A composite gasket according to claim 1 wherein said minor portion is encased by said major portion in an opposite radial direction.

3. A composite gasket according to claim 1 wherein said first segment comprises an axially extending latch member; and said second segment comprises a recess which mates with and positively engages said latch member.

4. A composite gasket according to claim 1 wherein said sealing lip comprises a leading edge and a trailing edge, said trailing edge being radially spaced from said major portion by a distance greater than said leading edge.

5. A composite gasket according to claim 4 wherein said leading and trailing edges are joined by a curved surface.

6. A composite gasket for forming a seal between a pipe bell and a spigot, comprising:
    a major portion of non-elastomeric plastic material; and
    a minor portion of elastomeric material, said minor portion being axially encased by said major portion and having a first sealing lip extending from said major portion in a radial direction, said major portion including first and second segments entrapping said minor portion therebetween, said segments having interlocking sections, said minor portion including a second sealing lip extending radially from said major portion in the same direction as said first sealing lip.

7. A composite gasket according to claim 6 wherein said second sealing lip is upstream of said first sealing lip and extends radially for a distance less than that of said first sealing lip.

8. A composite gasket for forming a seal between a pipe bell and a spigot, comprising:
    a major portion of non-elastomeric plastic material; and
    a minor portion of elastomeric material, said minor portion being axially encased by said major portion and having a first sealing lip extending from said major portion in a radial direction, said major portion including first and second segments entrapping said minor portion therebetween, said segments being directly bonded to form an integral member, said sealing lip being triangular in transverse cross section and tapering a radial direction toward said major portion.

9. A composite gasket according to claim 8 wherein said sealing lip comprises a leading edge and a trailing edge, said trailing edge being radially spaced from said major portion by a distance greater than said leading edge.

10. A composite gasket according to claim 9 wherein said leading and trailing edges are joined by a curved surface.

11. A composite gasket according to claim 8 wherein said segments are adhesively bonded.

12. A composite gasket according to claim 8 wherein said segments are welded.

13. A composite gasket for forming a seal between a pipe bell and a spigot, comprising:
 a major portion of non-elastomeric plastic material; and
 a minor portion of elastomeric material, said minor portion being axially encased by said major portion and having a first sealing lip extending from said major portion in a radial direction, said major portion including first and second segments entrapping said minor portion therebetween, said segments being directly bonded to form an integral member, said minor portion including a second sealing lip extending radially from said major portion in the same direction as said first sealing lip.

14. A composite gasket according to claim 13 wherein said second sealing lip is upstream of said first sealing lip and extends radially for a distance less than that of said first sealing lip.

15. A pipe fitting for a plastic pipe system, comprising:
 a cylindrical body having a radially extending circumferential groove and an internal diameter greater than 8 inches; and
 a composite gasket mounted in said groove, including
  a major portion of non-elastomeric material sealed in said groove, and
  a minor portion of elastomeric material, said minor portion being axially encased by said major portion and having a first sealing lip extending from said major portion in a radial direction, said major portion including first and second segments entrapping said minor portion therebetween, said segments having interlocking sections.

16. A pipe fitting according to claim 15 wherein said cylindrical body has an internal diameter between about 10 inches and about 36 inches.

* * * * *